United States Patent Office 3,085,119
Patented Apr. 9, 1963

---

3,085,119
PREPARATION OF VINYL METAL COMPOUNDS
Dietmar Seyferth, Arlington, Mass., assignor to Ethyl Corporation, New York, N.Y., a corporation of Virginia
No Drawing. Filed Feb. 19, 1959, Ser. No. 794,257
5 Claims. (Cl. 260—665)

The present invention is concerned with the preparation of vinyl metal compounds especially those of the alkali metals.

There have been many attempts heretofore to prepare the vinyl compounds of the alkali metals. Up until the present time such processes have been only of minor success or no success at all. For example, methyl substituted vinyl bromides have been reacted with lithium metal in diethyl ether to give the corresponding methyl substituted vinyl metal compound. This procedure is objectionable, however, since one-half of the lithium metal is consumed in producing the lithium salt as a by-product. An attempt has been further made to react vinyl chloride with lithium metal in tetrahydrofuran. Although it has been reported that reaction occurs, no vinyllithium product was apparently obtained. Additionally vinyl bromide has been reacted with certain organolithium reagents in an attempt to produce vinyllithium products, however, only products derived from dilithioacetylide were obtained. Thus, vinyllithium has never been prepared.

While some reactions have been performed wherein an organometallic compound is reacted with another organometallic compound to result in an exchange reaction producing different organometallic compounds, this reaction has been of limited utility because of inherent peculiarities therein, e.g. the reactions are reversible, and, so far as now known, has not been applied for the production of vinyl metal compounds.

Thus, it is desirable to provide a method for the preparation of the vinyl alkali metal compounds since such are of considerable use as will be brought forth hereinafter. It is particularly desirable to provide a method for producing vinyllithium, which has not heretofore been prepared.

Accordingly, it is an object of the present invention to provide a new and novel process for the preparation of vinyl metal compounds particularly those of the alkali metals. A further object is to provide such compounds in high yield and purity. A specific object is to provide a novel process for the production of vinyllithium. An additional object is to provide novel compositions of matter. These and other objects will be evident as the discussion proceeds.

It has now been found that vinyl alkali metal compounds can be produced by reacting an organo alkali metal compound with a vinyl compound of a metal having an electromotive potential lower than that of the alkali metals. Of the organo alkali metal compounds, those wherein the organo groups are aromatic and especially phenyllithium are preferred. Best results are also obtained when the vinyl metal reactant is one of the metals of group IV–A of the periodic chart of the elements, particularly tetravinyltin and tetravinyllead. Additional advantage is achieved when either the vinyl alkali metal product or the by-product metal compound is insoluble in the reaction system. Therefore, solvents can be employed to advantage for this and other purposes, particularly the aliphatic monoethers such as diethyl ether and similar alkyl ethers having up to about 8 carbon atoms in the hydrocarbon groups. Although a wide range of temperatures are applicable in conducting the process, it is preferable to employ a temperature between 0 to 70° C. Thus, a particularly preferred embodiment of the present invention is the reaction of phenyllithium with tetravinyltin or tetravinyllead, preferably the latter, in a monoether, especially diethyl ether, at a temperature between 0 to 70° C. but preferably at about room temperature. Another embodiment of this invention is the unique product having the vinyl group attached to lithium and such a product in solution in an ether, particularly diethyl ether.

The process of this invention is of particular advantage in that, for the first time, vinyl alkali metal compounds are obtained in high yield and in a simple, clear-cut, reaction. Likewise, quite unexpectedly, the reaction proceeds to completion and is not complicated by the problem of reversibility encountered in the prior art. Another advantage to the process is that the vinyl metal compound is obtained in a high state of purity which is readily recoverable from the reaction system. Further the process provides a method for producing the valuable product, vinyllithium, which has not been prepared heretofore. These and other advantages of the process of this invention will be apparent as the discussion proceeds.

The alkali metal compounds are, in general, organic compounds of the alkali metals. The alkali metals include the metals of group I–A of the periodic chart of the elements, e.g. lithium, sodium, potassium, rubidium, and cesium. The organo groups are, of course, different from those of the vinyl metal reactant. Thus, they will include aliphatic, alicyclic, and heterocyclic radials free of α-unsaturation, i.e., the carbon to which the alkali metal is bonded will be a saturated carbon atom, and aromatic radicals. Typical examples of such materials include ethyllithium, butyllithium, octyllithium, octadecyllithium, allyllithium, cyclohexyllithium, cyclopentadienyllithium, cyclopentyllithium, phenyllithium, benzyllithium, naphthyllithium, and the like including branch chain isomers thereof and such compounds wherein sodium, potassium, rubidium and cesium are substituted for lithium. It is to be understood that the hydrocarbon groups can be further substituted with other functional groups provided such are essentially inert in the reaction. Thus, the organo alkali metal compound will, in general, contain up to about 20 or more carbon atoms in each of the aforementioned organo radicals. It is preferred, however, to employ organo alkali metal compounds wherein the organo groups are hydrocarbon having up to and including about 8 carbon atoms, especially aromatic radicals. Likewise, of the alkali metals, lithium and sodium are preferred especially lithium.

The vinyl metal reactant is a vinyl compound of a metal lower in the electromotive series of the elements than are the alkali metals. In general such compounds will contain at least one vinyl group and the remaining substituents attached to the metal will be organic radicals or other ligands such as the halides. Included among such vinyl metal compounds are, for example, vinylmagnesium bromide, chloride, iodide, and fluoride; divinylmercury, tetravinylsilane, tetravinyltin, tetravinyllead, diphenyldivinyltin, dibutyldivinyltin and the like compounds wherein all radicals other than the vinyl radicals contain less than about 8 carbon atoms and are of the character described above in connection with the organo alkali metal compounds. Similar examples of such compounds of other metals and metalloids of the group II through V–A elements of the periodic chart of the elements as set forth in the Handbook of Chemistry, Lange, 8th edition, at pages 56 and 57, will be evident. It is preferable that the metal employed be one which forms a by-product organo-metallic compound which is insoluble in the reaction system. Likewise, it is desirable that the metal have only vinyl groups attached thereto and that it be a group IV–A metal, especially tin or lead, since best results and a more economical process are obtained when such are employed. Tetravinyllead is an especially advantageous vinyl metal compound to be employed.

The process of this invention will be further understood from a consideration of the following examples. In each instance all parts are by weight.

Example I

Employing a reactor equipped with internal agitation, external heating means, and a means for maintaining a nitrogen flush during the course of the reaction, there was added thereto 5.7 parts, 0.025 mole, of tetravinyltin. Agitation was commenced and the nitrogen atmosphere maintained. Then 0.1 mole, 8.4 parts of phenyllithium in 64 parts of diethyl ether was added rapidly to the reactor. A precipitate was noted to form immediately and the mixture was reacted for 30 minutes. The yield of vinyllithium product dissolved in the ether was 97 percent based on the amount of tetraphenyltin by-product recovered by filtration. If desired, the vinyllithium product can be recovered from the diethyl ether by evaporation of the latter.

Example II

In this run 0.139 mole of phenyllithium was prepared by reacting lithium shot with bromobenzene in 142 parts of diethyl ether and filtering excess lithium at the completion of the reaction. The phenyllithium was reacted with 0.034 mole of tetravinyltin diluted to 35 parts with diethyl ether without external heating. No temperature change was noted and a white precipitate immediately formed. The reaction mixture was then filtered and analysis of the product to determine the lithium to ethylene ratio indicated a 65 percent yield of vinyllithium product.

Example III

As in Example II, 0.198 mole of phenyllithium were prepared and then the ether solution thereof was separated from the excess lithium and the ether solvent evaporated at 0.1 to 0.05 millimeter of mercury for 4 hours. Then 150 parts of petroleum ether having a boiling point range of 40 to 60° C. was added to the white crystalline residue and the mixture stirred for one hour. This mixture of phenyllithium in petroleum ether was then reacted with 10.9 parts (0.048 mole) of tetravinyltin at room temperature. In this run, of course, the phenyllithium reactant, the vinyllithium product, and the tetraphenyltin by-product are insoluble in the mixture. The reaction was conducted for a period of 12 hours, although shorter reaction periods can be used, and then the mixture was filtered under a nitrogen atmosphere. The residue was washed with diethyl ether. Hydrolysis of the petroleum ether filtrate showed less than 1 percent of the theoretical amount of ethylene. Hydrolysis of a sample of the diethyl ether washings gave an evolution of ethylene corresponding to a 60 percent yield of vinyllithium product.

Example IV

Equally satisfactory results are obtained when Example I is repeated substituting phenylsodium or potassium for phenyllithium employing a reaction temperature of 0° C. to produce vinylsodium or potassium precipitated along with the tetraphenyltin.

Example V

In this run 62.8 parts of bromobenzene dissolved in 63 parts of diethyl ether were reacted with 6 parts of lithium in 175 parts of diethyl ether to produce phenyllithium. The ether solution was separated from the solids by filtration and settling, then 4.2 parts, 0.05 mole, of the phenyllithium in 32 parts of diethyl ether were reacted with 3.92 parts, 0.0125 mole, of tetravinyllead for ½ hour at room temperature without external heating. The yield of vinyllithium product was 91.2 percent based on the filtered and recovered tetraphenyllead by-product. The vinyllithium solution obtained was evaporated to remove the ether leaving a pale white solid. Hydrolysis of an aliquot of the solid product gave essentially ethylene. Another aliquot of the solid product was tested in a flame. The flame developed the deep red-purple color characteristic of lithium. A further sample of the solid was investigated microscopically during heating and essentially no crystallinity was observed. The pale white solid originally obtained upon evaporation of the ether, as indicated above, was not spontaneously flammable in air. It also was essentially insoluble in benzene and petroleum ether. An infrared spectrum of a sample of this solid examined as a mixture pressed with potassium bromide showed the presence of the vinyl group. An attempt to obtain a melting point of the solid resulted in its turning black on heating up to 110° C. with no melting up to 250° C. The residue after such heating appeared carbonaceous, did not dissolve in water, and evolved little gas on contact with water indicating pyrolysis of the product.

Example VI

When Example I is repeated substituting ethyllithium for phenyllithium and benzene for diethyl ether and conducting the reaction at 70° C. for 15 minutes, vinyllithium is again obtained in high yield.

Example VII

Vinyllithium is produced when 9.0 parts of cyclohexyllithium are reacted with 25.4 parts of divinyl mercury in triethylamine at 50° C. for 1 hour.

Example VIII

When 2 moles of naphthyllithium are reacted with 1 mole of vinylmagnesium chloride in diethyl ether at the reflux temperature for two hours, vinyllithium is obtained.

Example IX

Vinyllithium is produced in high yield when phenyltrivinyltin is reacted with benzyl lithium at 110° C. for two hours using nonane as a solvent.

Example X

When 9.4 parts of amylsodium are reacted with 31.5 parts of tetravinyllead employing tetrahydrofuran, 50 parts, as a diluent at a temperature of 65° for one hour, vinylsodium is precipitated from the reaction mixture.

It is not intended that the present invention be restricted to or limited by the above presented examples. Such are provided merely as illustrations and it will be evident that other alkali metals such as rubidium and cesium can be employed in place of lithium, sodium, and potassium, and other organo groups can be employed in place of those illustrated in the examples. Similarly, equally satisfactory results are obtained when one substitutes other vinyl metal reactants in place of those presented in the examples.

Generally, temperatures up to the decomposition temperature of the reactants or products are employable. For simplification in processing, reflux temperature or lower is employed in order to avoid the necessity of pressure operation. When temperatures much above about 100° C. are used some side reactions may occur as for example, ether cleavage when an ether is employed as a diluent. Therefore, in a preferred operation the temperature is generally between about 0 to 70° C. with pressure being used where necessary to maintain a liquid system or reflux temperature being employed when the system will boil at a temperature below 70° C. Room temperature, e.g. 25° C. and lower, is particularly advantageous to avoid side reactions and give high yields. As indicated there is no necessity for pressure operation but such can be employed particularly when temperatures above the boiling point of the reaction mixture are used.

Since the reactants and products are generally highly reactive to the atmosphere, it is desirable to conduct the reaction in an essentially inert atmosphere. For this purpose such inert gases as nitrogen, argon, neon, krypton, xenon, and vacuum are employable preferably pre-dried.

The reaction is essentially instantaneous so that relatively short periods of reaction are required. Generally speaking, times longer than about five hours are not needed and reaction periods of less than about one hour are preferred.

Diluents or solvents are not essential to the process but can be used to particular advantage, as for example heat distribution and solvation. They are particularly useful in order to result in a system whereby the product vinyl alkali metal compound or the by-product organometallic compound, preferably the latter, is to be precipitated from the reaction system. The organic solvents which are essentially inert under the reaction conditions and liquid are applicable. For such purpose the hydrocarbons, ethers, and tertiary amines have been found most suitable. Among the hydrocarbons are included both aliphatic and aromatic materials as for example the hexanes, octanes, nonanes, cyclohexanes, benzene, toluene, xylene, tetralin and the like. The ethers include for example diethyl ether, diamyl ether, dioctyl ether, methylamyl ether, diphenyl ether, dibenzyl ether, cyclic ethers, such as dioxane, tetrahydrofuran and the polyethers as for example the dimethyl, diethyl, dibutyl and the like ethers of ethylene glycol, diethylene glycol, triethylene glycol, and tetraethylene glycol. Included among the tertiary amines are for example trimethyl amine, triethyl amine, tri-n-butyl amine, triphenyl amine, dimethyl aniline, N-methyl piperidine, N-ethylmorpholine, and the like. While many of the ethers and amines will complex with certain reactants and products, this does not hinder their use. The solvents which are liquid under the reaction conditions and in which the by-product organometallic compound is insoluble are particularly preferred since precipitation of the by-product will enhance the rate of reaction and leave the desired vinyl alkali metal product in solution ready for use. When the vinyl alkali metal product is one which is insoluble in most of the above type solvents, it is desirable that the solvent be such that would solvate the by-product organometallic compound. Thus, this particular type of vinyl alkali metal compound, e.g., vinyl sodium will be precipitated from the reaction system and is easily recovered by filtration. For best results in connection with fast reaction and easy recovery of the product vinyl metal compound either in solution or as a precipitate in accordance with the above discussion, the ethers, particularly the simple or monoethers e.g. diethyl ether having up to about 8 carbon atoms are preferred when a lithium compound is desired. When a product of the other alkali metals, e.g. sodium, is desired an ether can be employed at lower temperature, e.g. below about 20° C., but liquid hydrocarbons are preferred at higher temperatures.

In conducting the process an excess of either reactant can be employed. If an excess is employed, it is preferable that the vinyl metal reactant be in excess. However, in order to simplify recovery of the desired vinyl alkali metal compound and to achieve best results, it is preferable to use essentially stoichiometric amounts of the organo alkali metal compound and the vinyl metal compound with which it is reacted. The amount of solvent, when such is employed, is generally sufficient to provide fluidity of the reaction system. Thus, amounts as high as 100 parts by weight per part by weight of the organo alkali metal reactant employed and higher can be used. In the preferred embodiments of this invention wherein either the vinyl alkali metal product or the by-product organometallic compound, preferably only the latter, is insoluble in the reaction system, it is advantageous to employ at least sufficient solvent to solvate essentially all of the vinyl alkali metal product under the conditions of reaction and separation of the product from the by-product. Another criterion of the quantity and the choice of the solvent to be employed is that it is preferably one which will precipitate the by-product organometallic compound but will solvate the reactants and vinyl alkali metal product, particularly the vinyllithium product.

The process of this invention provides products which are of considerable utility, namely the vinyl alkali metal compounds. For example, such can be employed for the formation of other vinyl metal compounds. In order to demonstrate the product produced and to illustrate one use, the vinyllithium solution obtained in Example I was reacted with arsenic trichloride. Trivinylarsine was produced in a yield of 51 percent. Likewise, when triethylchlorosilane was reacted with the product of Example I, triethylvinylsilane was obtained in a yield of 57 percent. Another use for the products produced is carbonation with carbon dioxide to produce acrylic acid which, in turn, is useful in the formation of polymers. These and other uses of the products produced will be evident to those skilled in the art.

Having thus described the process of this invention, it is not intended that it be limited except as set forth in the following claims.

I claim:

1. The process which comprises reacting an organo alkali metal compound with a vinyl compound of a group IV–A metal having an electromotive potential lower than that of the alkali metal.

2. A process for the production of vinyllithium which comprises reacting tetravinyltin with phenyllithium at a temperature between about 0 to 70° C. in the presence of an ether solvent.

3. The process for the manufacture of vinyl lithium which comprises reacting phenyl lithium with a vinyl group IV–A metal compound at a temperature between 0 to 70° C. in the presence of a solvent which will dissolve the vinyl lithium product and in which the by-product phenyl group IV–A compound is insoluble.

4. The process of claim 3 wherein said vinyl group IV–A metal compound is a tetravinyl group IV–A metal compound.

5. The process of claim 2 wherein said ether is diethyl ether.

References Cited in the file of this patent

UNITED STATES PATENTS

| | | |
|---|---|---|
| 2,873,287 | Ramsden | Feb. 10, 1959 |
| 2,914,578 | Nobis et al. | Nov. 24, 1959 |

OTHER REFERENCES

Morton et al.: Jour. Am. Chem. Soc., vol. 72, No. 8, pp. 7785–92, Aug. 1950.

Braude: "Organic Compounds of Lithium," Progress in Organic Chemistry, vol. 3, pp. 172–217, Academic Press, Inc., New York, 1955.

Coates: "Organic-Metallic Compounds" (1956), pp. 3 and 4, published by John Wiley & Sons, New York, N.Y.

"The Chemistry of Organometallic Compounds," Rochon et al., John Wiley & Sons, New York, pages 56 and 57, 1957.

Seyferth et al.: Jour. Am. Chem. Soc., vol. 79 pp. 515–17, Feb. 5, 1957.

Anderson et al.: J. Org. Chem., 23 750 (1958).

Nesmeyanov et al.: Izvest Akad, Nauk S.S.S.R., Otdel Kim Nauk 1940–1 (1958), C.A. 53 7973 (1959).